Aug. 26, 1941.    C. J. KELLER    2,254,117
TERMINAL CLIP MACHINE
Filed July 25, 1940    6 Sheets-Sheet 3
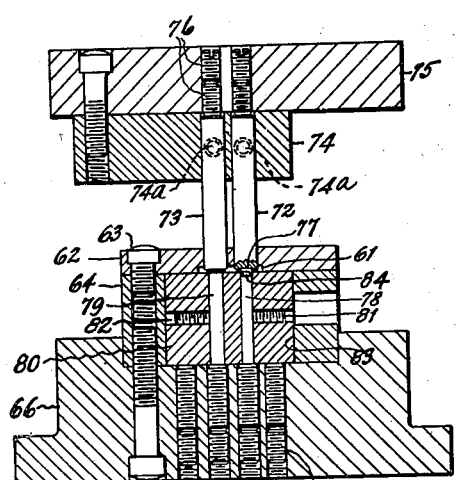
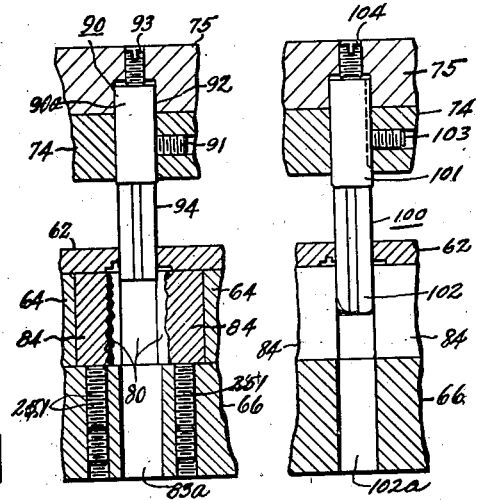
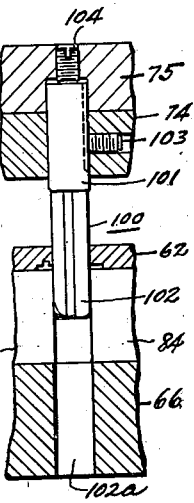
Fig. 10    Fig. 11    Fig. 12
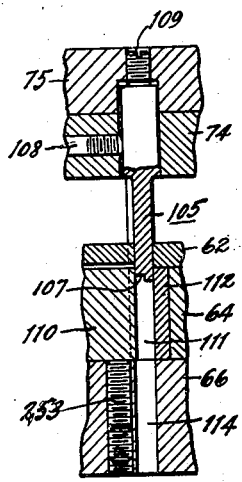
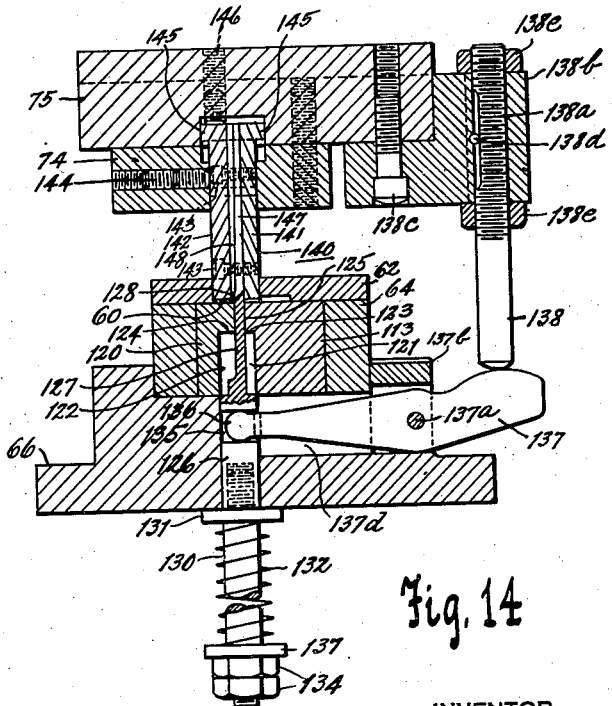
Fig. 13    Fig. 14
INVENTOR
Clarence J. Keller
BY
Spencer Hardman & Fehr
his ATTORNEYS Aug. 26, 1941.  C. J. KELLER  2,254,117
TERMINAL CLIP MACHINE
Filed July 25, 1940  6 Sheets-Sheet 4
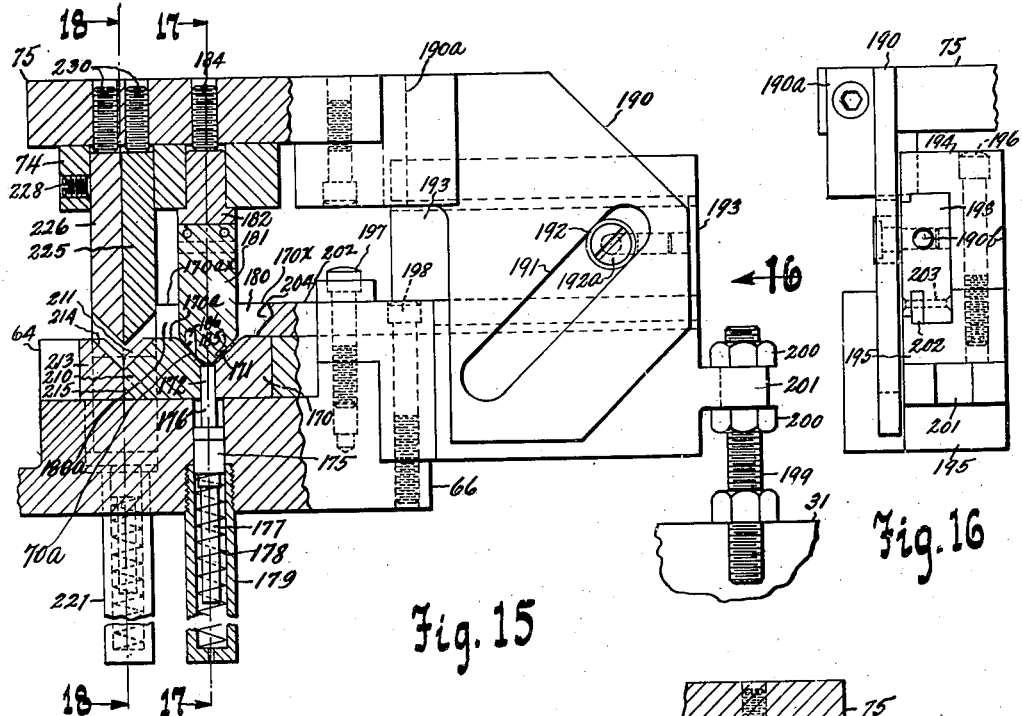
Fig. 15
Fig. 16
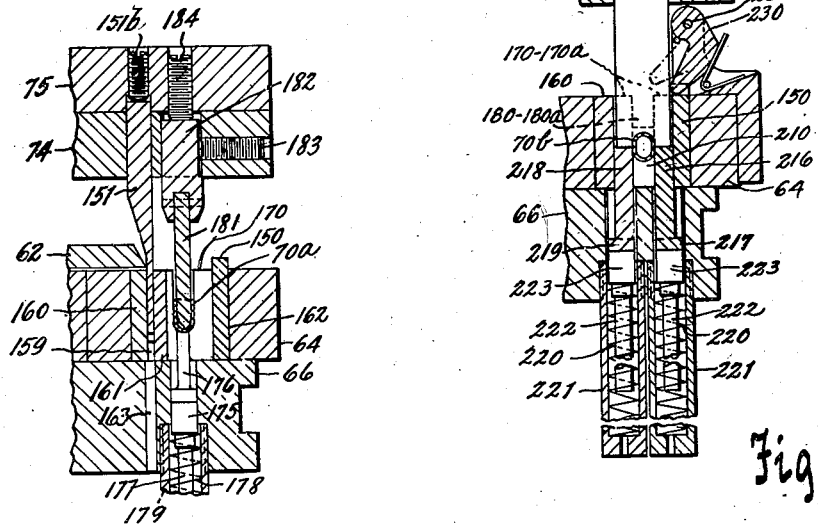
Fig. 17
Fig. 18
INVENTOR
Clarence J. Keller
BY
Spencer Hardman & Fehr
his ATTORNEYS Aug. 26, 1941.  C. J. KELLER  2,254,117
TERMINAL CLIP MACHINE
Filed July 25, 1940  6 Sheets-Sheet 5
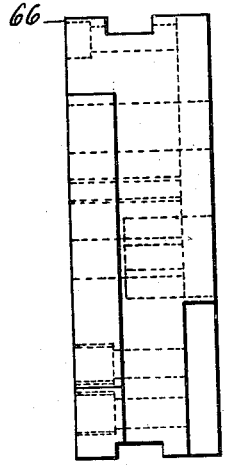
Fig. 21
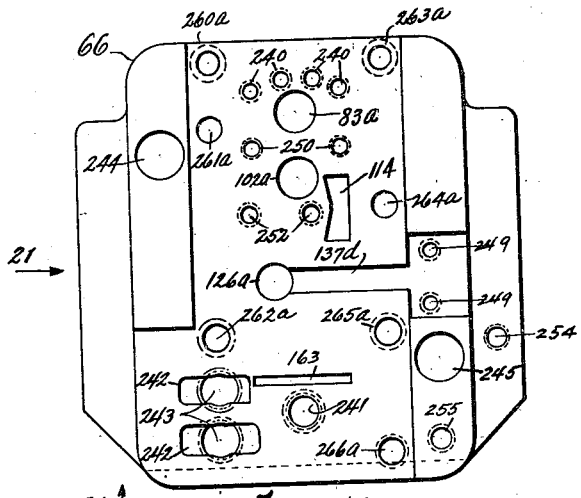
Fig. 19
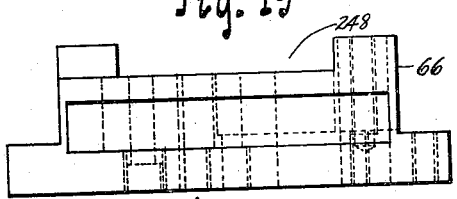
Fig. 20
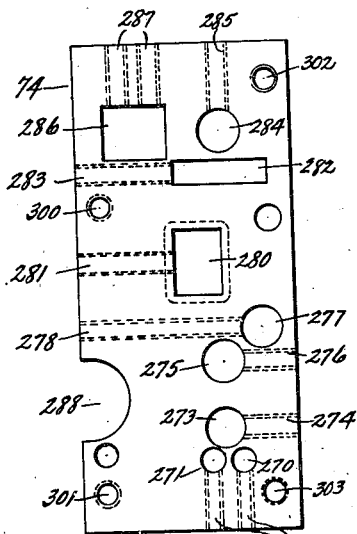
Fig. 24
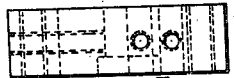
Fig. 25
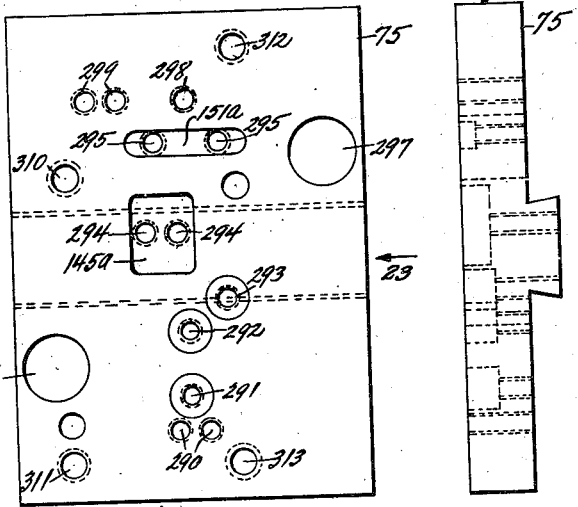
Fig. 23
Fig. 22
INVENTOR
Clarence J. Keller
BY
Spencer Hardman Fehr
his ATTORNEYS Aug. 26, 1941.    C. J. KELLER    2,254,117
TERMINAL CLIP MACHINE
Filed July 25, 1940    6 Sheets-Sheet 6
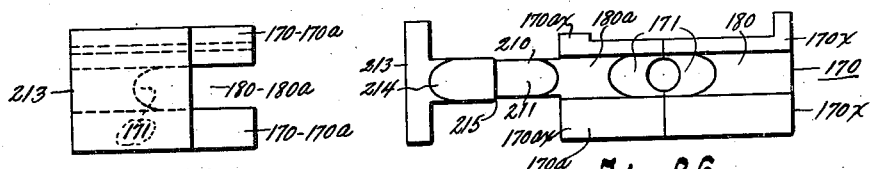
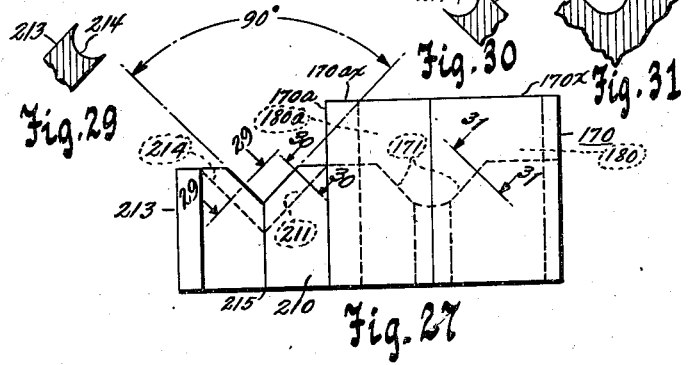
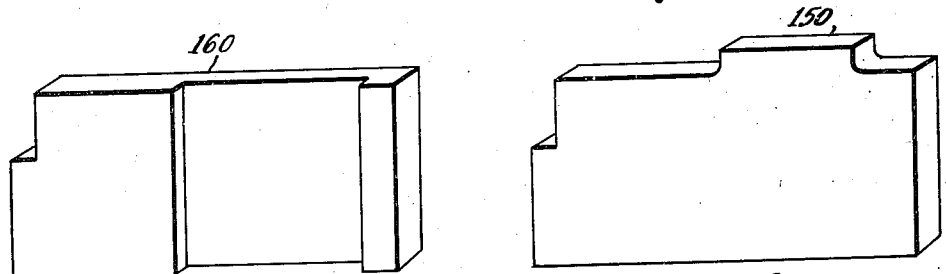
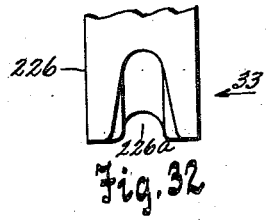
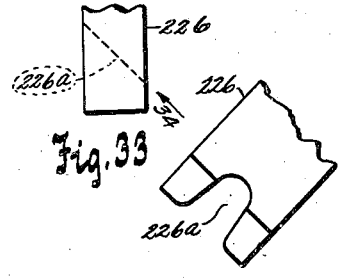
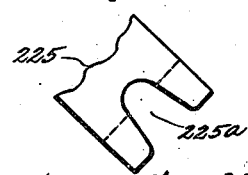
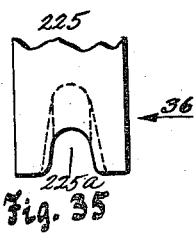
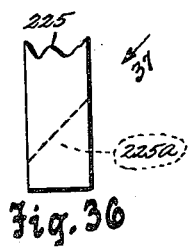
INVENTOR
Clarence J. Keller
BY
Spencer Hardman & Fehr
his ATTORNEYS Patented Aug. 26, 1941

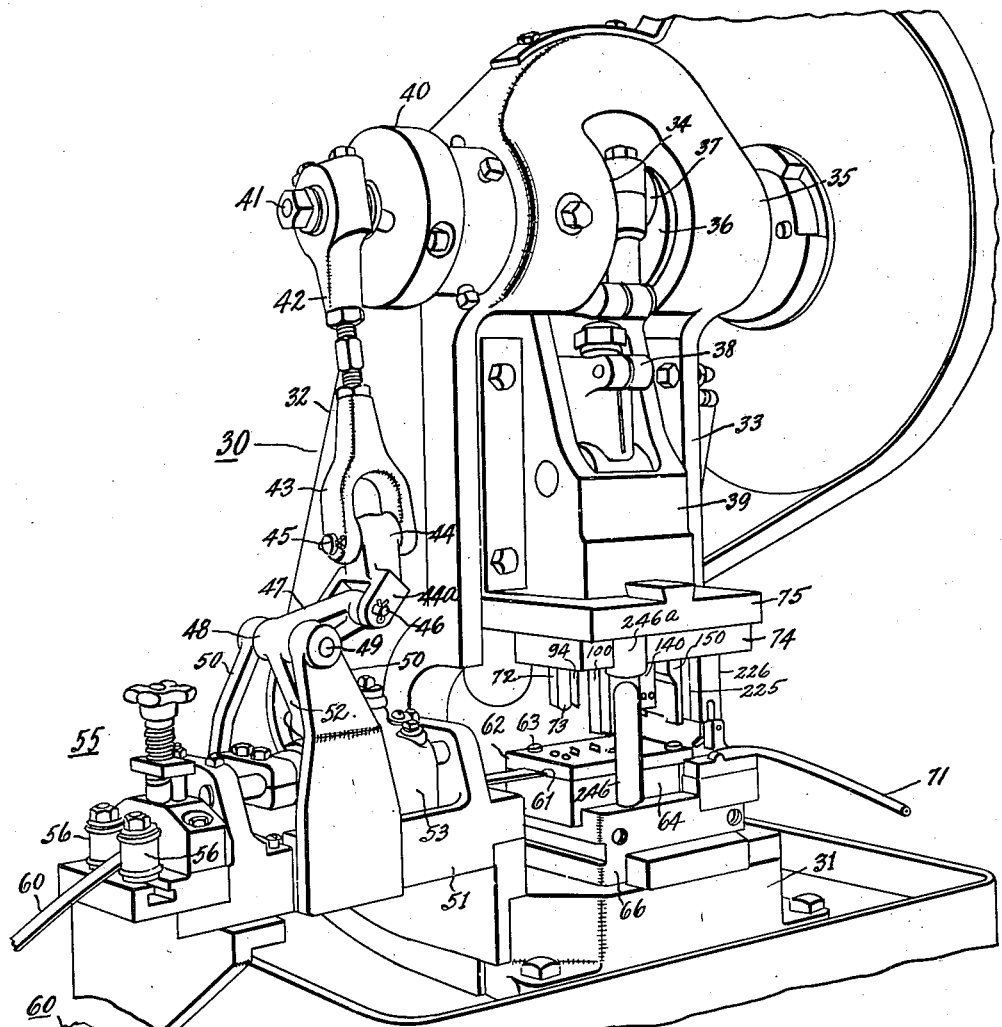

2,254,117

UNITED STATES PATENT OFFICE 2,254,117

TERMINAL CLIP MACHINE

Clarence J. Keller, Anderson, Ind., assignor to General Motors Corporation, Detroit, Mich., a corporation of Delaware Application July 25, 1940, Serial No. 347,513

6 Claims. (Cl. 153—1)

This invention relates to the manufacture of terminal members for electrical conductors.

An object of the present invention is to provide a machine for punching a blank from sheet material, forming the blank into an angular terminal member having a tubular socket to receive a plug and a tubular socket for attaching the terminal member to a cable.

Further objects and advantages of the present invention will be apparent from the following description, reference being had to the accompanying drawings wherein a preferred embodiment of the present invention is clearly shown.

In the drawings:

Fig. 1 is a fragmentary perspective view of the machine embodying the present invention.

Fig. 2 is a progressive view, in perspective, of a strip as it appears before a blank is severed from the strip of sheet metal.

Fig. 3 is a plan view, in perspective, after the blank is severed from the strip.

Fig. 4 is a perspective view of the blank bent into shape prior to attaching it to a cable.

Figs. 5 and 6 are perspective views of an angular terminal member formed from the blank and attached to the cable.

Fig. 10 is a sectional view on the lines 10—10 of Fig. 7, Fig. 8 and Fig. 9, showing the punches and dies for performing the first operation.

Fig. 11 is a sectional view on lines 11—11 of Figs. 7, 8 and 9, showing the punches and dies for performing the second operation.

Fig. 12 is a sectional view on lines 12—12 of Figs. 7, 8, and 9, showing a blank locating rod between the punches and dies for performing the second and third operations.

Fig. 13 is a sectional view on the lines 13—13 of Figs. 7, 8 and 9, showing the punches and dies for performing the third operation.

Fig. 14 is a sectional view on the lines 14—14 of Figs. 7, 8 and 9, showing the punches and dies for performing the 4th operation.

Fig. 15 is a sectional view on the lines 15—15 of Figs. 7, 8 and 9, showing the punches and dies for performing the 6th and 7th operations (in the 5th operation the blank is sheared by a shearing punch and die shown in section in Fig. 17).

Fig. 16 is a view taken in the direction of the arrow 16 in Fig. 15.

Fig. 17 is a sectional view on the lines 17—17 of Figs. 7, 8 and 9.

Fig. 18 is a sectional view on lines 18—18 of Figs. 7, 8 and 9.

Fig. 19 is a plan view of a base block for supporting a base frame and the dies.

Fig. 20 is an end view of the base block.

Fig. 21 is a side view of the base block.

Fig. 22 is a plan view of a block attached to the press head adapted to receive the shanks of a plurality of punches.

Fig. 23 is an end view looking in the direction of arrow 23 in Fig. 22.

Fig. 24 is a plan view of a block for supporting the punches.

Fig. 25 is an end view of the block looking in the direction of the arrow 24 of Fig. 24.

Fig. 26 is a plan view drawn to a larger scale than Figs. 9 and 15, showing an assembly of three die blocks used in performing the 6th and 7th operation.

Fig. 27 is a side view thereof.

Fig. 28 is an end view thereof.

Figs. 29, 30 and 31 are fragmentary sectional views on the lines 29—29, 30—30 and 31—31, of Fig. 27.

Fig. 32 is a fragmentary front elevation of the punch 226.

Fig. 33 is a side elevation.

Fig. 34 is a view in the direction of the arrow 34 of Fig. 33.

Fig. 35 is a fragmentary rear elevation of punch 225.

Fig. 36 is a side view thereof.

Fig. 37 is a view in the direction of arrow 37 in Fig. 36.

Figures 8, 9:
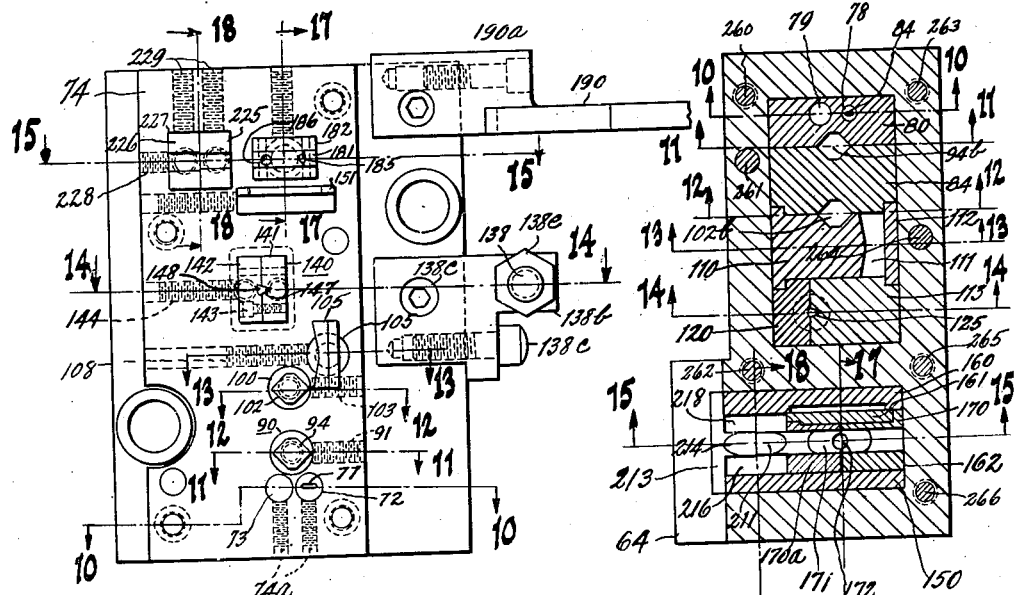
Fig. 8 is an underside view of the parts of the apparatus attached to the head of the punch press.
Fig. 9 is a horizontal sectional view of the die members supported within a base frame. (For sake of clearness, certain parts are in plan view.)

Fig. 38 is a side elevation of block 160 as viewed from the bottom of Fig. 9.

Fig. 39 is a side elevation of block 150 as viewed from the bottom of Fig. 9.

Referring to the drawings, a punch press 30 comprises a bed 31 having side frames 32 and 33 providing bearings 34 and 35 for a shaft 36 having a crank 37 connected by an eccentric link 38 with a reciprocable press head 39. The shaft 36 carries a crank disc 40 carrying an adjustable pin 41 connected to one end of an adjustable linkage 42. The other end of the linkage 42 is provided with a yoke 43 which is connected to one end of a link 44 by a pin 45. The link 44 has a yoke 44a connected by pin 46 with one arm 47 of a bell crank lever 48 pivotally mounted at 49 upon spaced brackets 50. The brackets 50 are supported on a frame 51, supported on the bed 31 of the press. The other arm 52 of the bell crank lever 48 is operatively connected with the slidable member 53 of a feed mechanism 55, said member 53 being slidably supported by the frame 51 between the brackets 50. The feed mechanism 55 is provided with adjustable guide rollers 56 between which a strip of sheet metal 60 is moved intermittently.

When the shaft 36 is rotated the feed mechanism 55 will be reciprocated to feed the strip of sheet metal 60 step-by-step through a shallow groove 61 provided on the lower side of a cover plate 62. The plate 62 is attached by suitable screws 63 to a base frame 64. The base frame 64 is secured by screws to the base block 66 in any suitable manner not shown.

Figure 7:
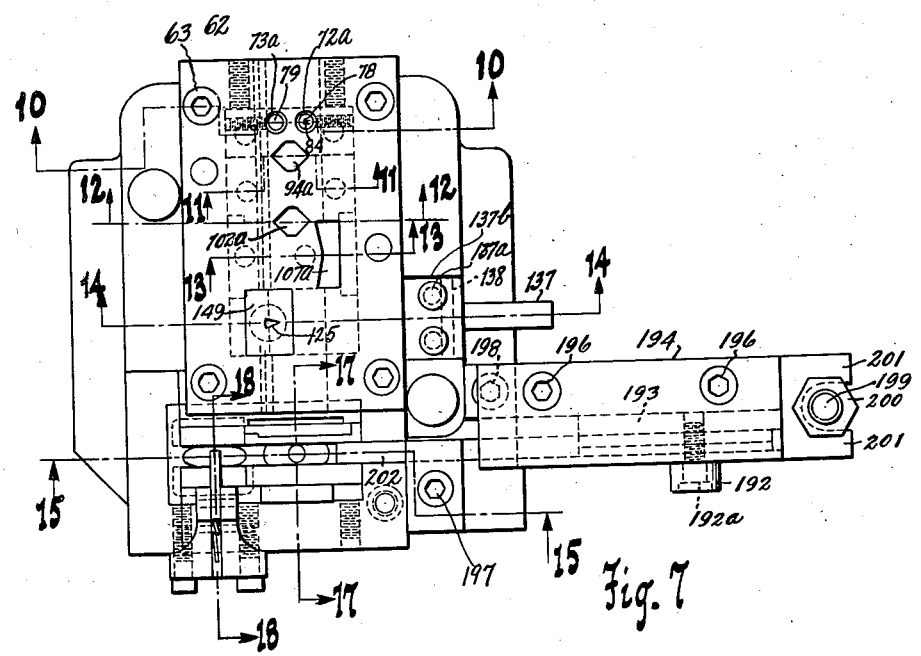
Fig. 7 is a plan view of the lower parts of the apparatus attached to the bed of a punch press.

The supply strip 60 is progressively fed by the feeding mechanism 55 over the top surface of the base frame 64 to the right as viewed in Fig. 1 and downwardly as viewed in Fig. 7; and is operated upon as shown in Fig. 2. Then a blank 70 (Fig. 3) severed from the strip is formed into an L-shaped member of U-cross section (Fig. 4). Then the L-shaped member is moved at right angles to the left where the U-shaped arms of the L-shaped member are formed into tubular shape (Fig. 5) with one arm being attached to a cable 71, and the other providing a socket to be attached to a terminal post.

The feed mechanism 55 is standard form of strip metal feeding apparatus and is not per se a part of the present invention. The feed illustrated is known to the trade as the U. S. Tool Co. slide feed.

The strip 60 is fed lengthwise past a series of punches and dies by an intermittent motion in steps, the distance of which is equal to the width of the blank 70 (Fig. 3). The first operation performed by the punches and dies is in Fig. 10. In this operation the strip 60 is operated upon by a pair of punches 72 and 73 attached to a block 74 by set screws 74a. The block 74 is attached to a block 75 which is secured to the press head 39. The block 75 is provided with tapped holes in alignment with the punches 72 and 73 to receive set screws 76 which may be screwed down against the punches. The punch 72 is provided at its lower end with an elongated recess 77 while the lower end of punch 73 is flat. Upon downward movement of punches 72 and 73 they will pass through suitable holes 72a and 73a in the cover plate 62 and cooperate with stationary rods 78 and 79 firmly secured in a block 80 by set screws 81 and 82 respectively. The block 80 is locked by screws 80a within an aperture 83 provided in the base frame 64. The upper end of the rod 78 has an elongated projector 84 of smaller dimension than the recess 77. The projection 84 is adapted to force a portion of the metal upwardly, into the recess 77 to form a detent or boss 85 in the metal strip 60 (Fig. 2). The upper end of the rod 79 is provided with raised letters (not shown) by which identification marks are impressed into the strip 60.

The second operation is shown in Fig. 11. There is no movement of the strip 60 between the first and second operations. The strip 60 is operated upon by a punch 90 having a shank 91 extending through the block 74 and into a recess 92 in the block 75. A tapped hole, provided in the block 75 is located above the recess 92 for receiving a set screw 93 which is screwed down against the shank 91 to limit the upward movement of the punch 90. The lower portion 94 of the punch is in the form of an irregular hexagon. The punch portion 94 passes through an opening 94a in the cover plate 62. The portion 94 of the punch 90 cooperates with die blocks 80 and 84, each block having a groove which when assembled side by side and locked within the aperture 83 form an opening 94b which corresponds to the contour of the punch portion 94. The pieces cut out from the strip 60 to provide the openings 95 are forced through between the grooves of the die blocks and into an aperture 83a in the block 66 in alignment with an opening (not shown) in bed 31.

Fig. 11 shows means for locating or centering the strip 60 while the different punches carried by the press head operate upon the strip. This locking means for the strip comprises a rod 100 having a shank 101 and a hexagonal portion 102 adapted to enter hole 102a in cover 62. The shank is secured to the block 74 by a set screw 103. The shank extends into a recess of the block 75 and is limited in its upward movement by a set screw 104 carried by the block 75. It will be observed that the hexagonal portion 102 is substantially longer than the lower end 94 of the punch 90, thus the lower end of the rod 100 will enter the previously formed aperture 95 in strip 60 to lock the strip in position against further movement before the other punches can operate upon the strip 60. Rod portion 102 passes through an opening 102b between blocks 84 and 110 (Fig. 9).

The third operation is performed by the punch and die members shown in Fig. 13. In this operation the right edge portion (Fig. 2) of strip 60 is cut-away along the lines 105a by a punch 105 having a shank 106 and cutting portion 107. The shank 106 is secured to the block 74 by a set screw 108. The shank 106 extends into a recess in the block 75 and is limited in its upward movement thereon by a set screw 109. The cutting portion 107 upon downward movement of the press head 39 is adapted to pass through an opening 107a in the cover plate 62 said opening corresponding to the contour of the cutting portion 107. The portion 107 cooperates with a die 110 to shear the edge portion of the strip 60. The pieces which are cut off gravitate through the opening 111. The opening 111 is located between the die block 110 and a plate 112 retained in notches provided by die block 84 and a die block 113. The plate 113 guides the plane side of punch 107. The opening 111 is located above an opening 114 in the base block 66. The bed 31 is also provided with an opening (not shown) through which the cut-off portions gravitate into a suitable container.

The fourth step is that of piercing the strip 60 to form the tang 128 (Fig. 2). Referring to Fig. 14, the piercing apparatus comprises the die block 113 and a die block 120. The die blocks 113 and 120 are provided with semi-cylindrical portions 121 and 122 having shoulder portions 123 and 124 respectively. The shoulder 123 of die block 113 is provided with a V-shaped groove or notch 125 and the shoulder 124 closes the notch to form an opening of triangular shape. Guided between the semi-cylindrical portions 121 and 122 is a plunger 126 which carries a V-shaped piercing member 127 which is adapted to extend into and slide in the V-shaped notch 125. The purpose of the member 127 is to pierce the strip 60 to form the pointed tang 128 (Figs. 2 and 14). The lower end of the plunger 126 is connected with a rod 130 which passes loosely through a washer 131 bearing against the bottom of the bed 31. The plunger 126 and the rod are normally held in a non-operating position by a spring 132 located between the washer 131 and a washer 133 retained on rod 130 by nuts 134. The plunger 126 is provided with a notch 135 to receive a toe 136 of a lever 137 pivotally supported at 138 on the bed 66. When the press head 39 descends, the plunger 126 is moved upwardly due to the engagement of a rod 139 carried by the block 74 with the lever 137. When this occurs the punch 127 pierces the strip 60 and forms the tang 128 around a forming device 140.

A forming device 140 comprising blocks 141 and 142 and secured together by screws 143 is attached to the block 74 by set screw 144. The blocks 141 and 142 are of rectangular shape and each block is provided at its upper end with a flange 145 adapted to fit within a recess provided in the blocks 74 and 75. The forming device 140 is limited in its upward movement by set screw 146. The block 141 is provided with a V-shaped groove 147 which cooperates with a groove 148 of the block 143 to receive the piercing punch 127 and the tang 128 of the strip 60. The piercing punch 127 cooperates with the forming device 140 to punch out and to bend the tang 128 at substantially right angles to the plane of the strip 60 and into the groove 148 of block 142. Forming device 140 passes through hole 149 in plate 62 when the press head 39 descends.

Rod 138 is provided with a threaded portion 138a passing through a plain hole in a bracket 138b attached by screws 138c to the block 75. A cross pin 138d received by a groove in rod 138 prevents the turning of this rod while securing it to bracket 138b in the desired position of vertical adjustment by turning the nuts 138c.

The fifth operation is that of severing the blank 70 from strip 60 (Fig. 2). After the strip 60 is pierced to form the tang 128, the strip is fed against a stop 150 (Fig. 17) which is in the aperture 162 of the frame 64 (Fig. 17) upon the upward movement of the press head. When the head 39 is moved downwardly the foremost portion of the strip 60 is severed from the remainder of the strip by a punch 151 secured to the blocks 74 and 75 in the manner of securing the punching members previously described. The punch 151 cooperates with block 160 to sever the blank 70 from the strip at a point that is substantially in the center of the hexagonal opening 95. The pieces cut out by the punch 151 are forced through an opening 159 between blocks 160 and 161 which lock in the opening 162 provided by the base frame 64. These pieces pass through an opening 163 in block 66 and then drop into a container provided for same. The blank 70 comprises an intermediate portion 155 having the detent 85 adjacent the edges 105a which were severed by the punch 105 and the tang 128 adjacent the opposite straight edge (Fig. 3). The detent 85 and the tang 128 in this instance are in transverse alignment with each other. Since the blank is severed from the strip in the middle of the opening 95 the intermediate portion 155 is provided at each corner with a wing 158.

After the blank 70 is severed from the strip the blank will rest upon the top surfaces of die blocks 170 and 170a locked in the opening 163. The die blocks 170 and 170a together provide a V-shaped notch 171 and a hole 172 at the bottom of the notch.

A plunger 175, having reduced portions 176 and 177, is slidably supported within an opening in the block 66. The reduced portion 176 has a sliding fit with the opening 172 and is urged upwardly by a spring 178 around the portion 177 and having one end bearing against the shoulder formed thereby and the other end resting against a bottom wall of a tubular housing 179 having threaded engagement with the block 66. Normally the plunger 175 rests against the bottom surface of the die member 170 and 170a so that the top end of the reduced portion 176 is flush with the top surface 170x and 170ax, respectively, of the die members 170 and 170a.

In Figs. 26, 27 and 28 which show an assembly of die blocks 170 and 170a, it will be seen that there is a channel 180—180a between parallel side walls for receiving and guiding the work when transferred between the 6th and 7th operations.

The sixth operation is performed by dies 170—170a in cooperation with a punch 181 which is received in channel 180—180a. Punch 181 is attached to a block 182 secured to block 74 by screw 183 and located by a screw 184 in block 75. The channel 180—180a and the notch 171 are of such width as to accommodate the punch 181 and two thicknesses of the metal blank. The lower end of punch 181 conforms to the notch 171. The notch 171 is rounded and likewise the lower end of the punch 181 (Fig. 17). The lower end of the punch 181 is provided with a recess 185 to receive tang 128 and a recess 186 to receive the detent 186 when the blank is formed into angular shape 70a. As the blank 70 is thus formed, the wings 158 are formed into V-shaped channels by the cooperation of the side surfaces of the punch 181 with the side walls of the channel 180—180a. The plunger 176 moves down with the work piece; and, when the punch 181 moves up, the plunger 176 moves up under the action of spring 178 so that the work piece 70a will be lifted up so that its lowest portion is at the level of the bottom of channel 180—180a. The work piece 70a is ready to be transferred to the dies which perform the 7th and last operation. The means for transferring the work piece 70a will now be described with reference to Figs. 15 and 16.

During the upward movement of the press head 39 a cam plate 190, welded to a bracket 190a attached to the head, moves with it. The plate is provided with an inclined slot 191 to receive a roller 192 journaled on screw 192a carried by a slide 193. The slide 193 is slidably supported in guide members 194 and 195 which are held together by bolts 196. The guide 195 is secured to the plate 66 by screws 197 and 198 and to the bed 31 by a stud 199 screwed into bed 31 and cooperating with nuts 200 between which there is clamped the bifurcated lug 201 of guide 195. A transfer bar 202 is attached to the slide 193 by rivets 203. The inner end of the bar 202 is provided with a V-shaped notch 204 which is adapted to engage one arm 70ax (Fig. 4) of the work piece 70a and move same at right angles to the direction of travel of the strip 60 to place the work piece in position so as to complete the bending of the wings 158 of each arm into tubular shape.

In the 7th and final operation the left hand set of wings 158 (Fig. 5), enclosing the tang 128, is to be bent around an insulated cable 71 as shown at 70b thereby forcing the tang 128 through the insulation of the cable into electrical contact with the conducting wire of the cable. The right hand set of wings 158 enclosing detent 85 is bent around to form a tubular socket for receiving a terminal plug or binding post, with which the detent 85 cooperates to maintain the terminal member 70b upon the binding post.

Referring to Figs. 26 and 27, the die 170a has an extension 210 having an inclined semi-cylindrical groove 211 slightly less than the width of the channel 180a. A T-shaped die member 212 has its shank 213 (slightly wider than extension 210) also provided with an inclined semi-cylindrical groove 214. The ends of parts 210 and 213 abut at 215. The space between plate 150 and parts 210 and 213 receives a plunger 216 having a flange 217 for normally abutting the underside of plate 150. The space between plate 160 and parts 210 and 213 receives a plunger 218 having a flange 219 which normally abuts the underside of block 160. Plungers 216 and 218 are urged upwardly by springs 220 confined in tubes 221 and surrounding the stems 222 of plungers 223 which engage these plungers.

Grooves 211 and 214 respectively receive the lower ends of forming punches 225 and 226 having at their lower ends, semi-cylindrical, inclined grooves 227 and 228 respectively. Slide 204 transfers the work piece 70a into alignment with parts 210 and 213 and the piece 70a gravitates into grooves 211 and 214. The wire 71 is placed within the V-channel of the left arm of the work piece 70a. Then the punches 225 and 226 descend, and their grooved lower ends engage the pair of wings 158 to form them as shown at 70b (Fig. 5). The tang 128 is caused to pierce the cable insulation and engage the wire thereof. During the descent of the punches 225 and 226 and the work piece the pungers 216 and 218 descend to further compress the springs 220. When the punches 225 and 226 ascend, the plungers 216 and 218 ascend to eject the work.

The upper ends of punches 225 and 226 are received by a recess 227 in plate 74 and are secured by screws 228 and 229 and are located by screws 230 in plate 75.

To assure that the work piece in the form 70a remains within the grooves 211, 215 and under the punches 225, 226, accidental dislodgment of the piece 70a is prevented by a finger 230 normally having the position 230a (Fig. 18) in dot-dash lines. The piece 70a moves under this finger while being transferred from notch 171 to the notch between blocks 210 and 213. Finger 230 is pivotted at 231 upon a bracket 232 attached to frame 64 and is urged by spring 233 toward a stop pin 234. When punches 225 and 226 descend, the finger 230 is cammed toward the right in Fig. 18.

Referring to Figs. 19, 20 and 21, showing the base plate 66, the tapped holes 240 receive the screws 241, (Fig. 10) which clamp the block 80 against the cover 62. Hole 102a is provided to receive punch 102 (Fig. 12). Hole 126a receives the plunger 126 and notch 137d provides clearance for the lever 137 (Fig. 14). Numeral 241 indicates a counterbored and tapped hole for receiving tube 279 (Fig. 15). Recess 242 receives plunger 218; and recess 243 receives plunger 216 (Fig. 18). Numeral 243 indicates two tapped holes for receiving two tubes 221 (Fig. 18). Within holes 244, and 245, there are press fitted the pilot pins 246 and 247 (Fig. 1 shows pin 246). Numeral 248 (Fig. 20) indicates the notch for receiving the frame 64 (Fig. 9). Numeral 249 (Fig. 19) refers to tapped holes for receiving the screws 137c (Fig. 7). Numeral 250 refers to tapped holes for receiving screws 251 (Fig. 11) which clamp the block 84 against the cover 62. Numeral 252 refers to tapped holes for receiving screws 253 (Fig. 13) which clamp the block 110 against the cover 62. Tapped hole 254 receives screw 198 (Fig. 15). Tapped hole 255 receives screw 197 (Fig. 15).

Referring to Fig. 9, the frame 64 is attached to the base plate 66 by screws 260, 261, 262, 263, 264, 265, 266 received by holes 260a, 261a, 262a, 263a, 264a, 265a, 266a (Fig. 19) provided respectively by base 66.

Referring to Figs. 24 and 25, plate 74 provides holes 270 and 271 respectively for receiving the punches 72 and 73 (Fig. 10), and with tapped holes 272 for receiving the screws 74a (Fig. 10). Plate 74 provides hole 273 for receiving the punch shank 90a (Fig. 11) and a tapped hole 274 for receiving screw 91. Plate 74 provides a hole 275 for receiving the shank 101 of punch 100 (Fig. 12) and with a tapped hole 276 for receiving the screw 103. Numeral 277 indicates a hole for receiving a shank of punch 105, and 278 the tapped hole for receiving the screw 108 (Fig. 13). Numeral 280 indicates the square hole for receiving the composite punch 140 (Fig. 14) and 280 indicates the tapped hole for receiving the screws 144. Numeral 282 indicates the square hole for receiving the shearing punch 171 (Fig. 17), and 283 indicates a tapped hole for receiving a screw, not shown, which clamps the punch 171 in the plate 74. Numeral 284 indicates a hole for receiving the shank of rod 182 (Fig. 17); and 285 indicates the tapped hole for receiving the screws 183. Numeral 286 indicates the square hole for receiving punches 225 and 226 (Figs. 8 and 15); and 287 indicates the tapped holes for receiving the screws 229; 288 indicates a notch for clearing pilot pin bushing 246a.

Referring to Figs. 22 and 23, within holes 296 and 297 in plate 75 there are mounted the pilot pin bushing 246a and 247a which respectively receive the pilot pins 246 and 247. Numeral 290 indicates the tapped holes for receiving screws 76 (Fig. 10). 291 is the tapped hole for receiving the screw 98 (Fig. 11); 292 is the tapped hole for receiving the screw 104, (Fig. 12). 293 is the tapped hole for receiving the screw 109, (Fig. 13). The recess 145a receives the flanges 145 of the parts 142 and 141 (Fig. 14). Tapped holes 294 receive the screws 146 (Fig. 14). A recess receives the upper end of punch 151 (Fig. 17). Tapped holes 295 receive the screws 151b, (Fig. 17). Tapped hole 298 receives the screw 184 (Fig. 15). Tapped holes 299 receive screws 230 (Fig. 15). Holes 300, 301, 302, and 303, of plate 74 (Fig. 24) align with holes 310, 311, 312 and 313 of plate 75 (Fig. 22) for receiving screws which secure paltes 74 and 75 together.

While the embodiment of the present invention as herein disclosed, constitutes a preferred form, it is to be understood that other forms might be adopted, all coming within the scope of the claims which follow.

What is claimed is as follows:

1. Apparatus for forming an angular tubular terminal clip and for attaching the clip to a cable comprising in combination; punch and die members for forming a series of connected blanks from a sheet of strip material; means for severing the foremost blank from the remainder of the strip; means for bending the severed blank into an angular member to provide a pair of arms and concurrently bend the arms into U shape; means for completing the bending of the arms into tubular form, one of the arms being bent about the cable in order to attach the angular terminal clip to the cable.

2. Apparatus for forming an angular tubular terminal clip and for attaching the clip to a cable, comprising in combination; a plurality of punch and die members for forming from a strip of sheet metal a series of connected blanks comprising wings on each side of an intermediate portion, said wing being adapted to provide arms for embracing a conducting element, said blank being connected by the wing portions; means for severing the wings of the foremost blank from the remainder of the strip; means for bending the severed blank into an L-shaped member and simultaneously bend the wings to provide arms of U-shaped formation; means for completing the bending of the wings to provide arms of tubular formation, one set of wings being bent around the cable in order to attach the terminal clip to the cable.

3. Apparatus for forming an angular terminal ferrule and for attaching one arm of the ferrule to a cable comprising, in combination; means for forming a strip of sheet metal connected blanks with each blank comprising an intermediate portion and spaced ears on each side thereof; means for deforming the intermediate portion to provide a detent near one end of the blank; means for penetrating the intermediate portion to form a pointed prong at the other end of the blank; means for severing the blanks from the remainder of the strip; means for bending the intermediate portion of the severed blank between the detent and the prong to provide an angular member and concurrently bending the ears to provide a pair of arms of U-cross section, one of the arms enclosing the detent and the other arm enclosing the prong, said last mentioned arm being adapted to receive an end of the cable; and means for completing the bending of the ears of each arm into tubular form and causing the pointed prong to pierce the insulation and engage the conducting element of the cable.

4. Apparatus for forming an angular terminal ferrule and for attaching the ferrule to a cable, comprising in combination; means for forming from a strip of sheet metal connected blanks with each blank having an intermediate portion provided with wings at each corner; means for deforming the intermediate portion between one pair of wings to provide a detent; means for piercing the intermediate portion between the other pair of wings to provide a pointed prong in longitudinal alignment with the detent; means for trimming the edges of the wings adjacent the detent to provide an irregular edge; means for severing the blanks from the remainder of the strip; means for bending the severed blank along its longitudinal length into an angular member and concurrently bending the intermediate portion on each side of a medial line into a U member so that the innermost edges of the wings located on the same side of the medial line substantially abut each other with the angular U-shaped arm including the pointed prong adapted to receive the cable; means for bending the wings into tubular form and causing the pointed prong to pierce the insulation of the cable and engage the conducting element of the cable.

5. Apparatus for forming an angular tubular clip and for attaching the clip to a cable, comprising in combination; means for forming from a strip of sheet metal connected blanks with each blank having an intermediate portion provided with a spaced detent and a spaced pointed portion in longitudinal alignment; means for deforming the strip to provide the detent means for punching the strip to provide the intermediate portion with wings at each corner; means for trimming the edge of the strip adjacent the detent to provide an irregular edge; means for piercing the intermediate portion of the blanks to provide the pointed portion; means for severing the blanks from the strip; means for bending the intermediate portion along a medial line into V-shape and deforming the section forming the medial line including the wings into U-shape with the angular U-shape arms including the pointed portion adapted to receive a cable; means for bending the wings into tubular members and causing the pointed portion to pierce the insulation and engage the conducting element of the cable.

6. Apparatus for forming an L-shaped terminal ferrule and for attaching one arm of the ferrule to a cable, comprising in combination; means for forming from a strip of sheet metal connected blanks with each blank having an intermediate portion provided with a wing at each corner with adjacent edges of the wings on the same side of a longitudinal medial line being inclined toward each other; means for deforming the intermediate portion to provide a detent at one end of the blank; means for piercing the intermediate portion to provide a pointed prong at the other end of the blank; means for severing the blanks from the remainder of the strip; means for bending the severed blank between the detent and the pointed prong into an L-shaped channel member of U-cross section throughout with the inclined edges of the wings on the same side of the medial line substantially abutting each other and having the detent and the pointed prong projecting into different arms of the channel; and means for bending the wings into tubular form, one pair of wings being bent around the cable and causing the pointed prong to pierce the insulation and engage the conducting element of the cable.

CLARENCE J. KELLER.